United States Patent
Melito

(10) Patent No.: US 9,179,531 B2
(45) Date of Patent: Nov. 3, 2015

(54) SUPER CONDUCTING SUPER CAPACITOR

(75) Inventor: Carl Frank Melito, Dallas, TX (US)

(73) Assignee: MELITO INC, Dallas, TX (US)

( * ) Notice: Subject to any disclaimer, the term of this patent is extended or adjusted under 35 U.S.C. 154(b) by 371 days.

(21) Appl. No.: 12/772,213

(22) Filed: May 2, 2010

(65) Prior Publication Data

US 2011/0267011 A1    Nov. 3, 2011

(51) Int. Cl.
*H02J 7/00* (2006.01)
*H05F 7/00* (2006.01)
*H01G 9/00* (2006.01)
*H02J 7/34* (2006.01)

(52) U.S. Cl.
CPC ............... *H05F 7/00* (2013.01); *H01G 9/155* (2013.01); *H02J 7/345* (2013.01); *Y02T 10/7022* (2013.01)

(58) Field of Classification Search
CPC .......... H02J 7/345; H05F 7/00; H01G 9/155; Y02T 10/7022
USPC .................................................. 320/166, 167
See application file for complete search history.

(56) References Cited

U.S. PATENT DOCUMENTS

| | | | | |
|---|---|---|---|---|
| 911,260 | A * | 2/1909 | Pennock | 307/149 |
| 1,014,719 | A * | 1/1912 | Pennock | 307/149 |
| 1,540,998 | A | 6/1925 | Plauson | |
| 4,109,291 | A | 8/1978 | Bozzini | |
| 4,122,512 | A * | 10/1978 | Peterson et al. | 363/14 |
| 4,493,014 | A * | 1/1985 | Higashino | 363/14 |
| 4,926,061 | A * | 5/1990 | Arreola, Jr. | 290/55 |
| 5,367,245 | A * | 11/1994 | Mims | 322/2 R |
| 6,012,330 | A * | 1/2000 | Palmer | 73/170.24 |
| 6,735,830 | B1 * | 5/2004 | Merciel | 250/324 |
| 7,033,406 | B2 * | 4/2006 | Weir et al. | 29/623.5 |
| 7,440,660 | B1 | 10/2008 | Jin et al. | |
| 7,478,712 | B2 * | 1/2009 | McCowen | 191/45 R |
| 8,024,037 | B2 * | 9/2011 | Kumar | 607/5 |

(Continued)

FOREIGN PATENT DOCUMENTS

| AU | 2010352554 | 10/2014 |
|---|---|---|
| AU | 2010352554 | 2/2015 |

(Continued)

OTHER PUBLICATIONS

Wikipedia on Lightning Nov. 22, 2010.

(Continued)

*Primary Examiner* — Richard Isla Rodas
*Assistant Examiner* — Nathaniel Pelton
(74) *Attorney, Agent, or Firm* — Carl F. Melito

(57) ABSTRACT

A super capacitor (SC) and methods are disclosed, forming massive embedded capacitors connected in parallel over very wide radii varying from a few square feet to hundreds of square miles. The SC is enclosed within a water proof housing to keep out water by depositing a plurality of alternating layers of dielectric material between each conducting layer, whereby one or more electrodes are situated on each dielectric layer, and having at least one probe electrode exuding from said housing, and connected to the one or more electrodes, for receiving electric charge from a lightning source, for example. The dielectric layers separating each conducting layer may vary from a few layers to thousands, and possibly even millions or more layers, for example, to define a multilayer capacitive structure capable of providing electric power to supplement or replace other sources of electric power that harm the environment.

22 Claims, 3 Drawing Sheets

(56) References Cited

U.S. PATENT DOCUMENTS

| | | | | |
|---|---|---|---|---|
| 8,045,314 | B2* | 10/2011 | Ibok | 361/231 |
| 2008/0303488 | A1 | 12/2008 | Khan | |
| 2009/0109712 | A1* | 4/2009 | Calloway | 363/32 |
| 2010/0007321 | A1* | 1/2010 | Ogram | 323/299 |
| 2010/0116574 | A1* | 5/2010 | Gilmore | 180/65.285 |
| 2010/0123582 | A1* | 5/2010 | Smith et al. | 340/572.3 |
| 2010/0220424 | A1* | 9/2010 | Ibok | 361/117 |

FOREIGN PATENT DOCUMENTS

| | | | |
|---|---|---|---|
| CA | 2797815 | | 6/2015 |
| CN | 11H81182 | | 8/2015 |
| DE | 4205521 | | 4/1993 |
| EP | 1471545 | * | 10/2004 |
| EP | J054133 | | 5/2013 |
| EP | J054133 | | 5/2014 |
| EP | 2449568 | B1 | 11/2014 |
| GB | 2210819 | | 6/1989 |
| GB | 2303488 | | 2/1997 |
| JP | S63-245971 | | 10/1988 |
| JP | 01177837 | | 7/1989 |
| JP | 0898222 | | 11/1996 |
| JP | 10145169 | | 5/1998 |
| JP | 201255345 | | 9/2001 |
| JP | 2002081011 | | 3/2002 |
| JP | 2012528132 | | 3/2015 |
| KR | 10-2005-0095665 | | 9/2005 |
| KR | 10-2012-7002978 | | 7/2014 |
| RW | 126/ARK | | 6/2012 |
| SA | 2011-09109 | | 1/2013 |
| WO | 2004073971 | | 9/2004 |
| WO | WO2008005628 A2 | | 1/2008 |
| WO | WO2008005628 A3 | | 3/2008 |
| WO | WO2009003250 A1 | | 1/2009 |
| WO | WO 2009/140658 | | 11/2009 |
| WO | PCTUS10/062389 | | 8/2011 |

OTHER PUBLICATIONS

Melito, Carl F., Document attached as "Executive_Summary.pdf" published on website http://www.melito.com/scsc.htm, just republished this month, Feb. 2014. The Executive Summary provides concise but relevant applications of the Super Conducting Super Capacitor.

An Everlasting Lightning Storm, The third hidden wonder of South America,.By Joshua Foer; http://www.slate.com/articles/life/world_of_wonders/2011/02/an_everlasting_lightning_storm.html, published on the internet and at Puerto Concha, Venezuela. Document is attached as Lightning_Farms_1, 2 and 3.pdf.
http://www.dailymail.co.uk/video/sciencetech/video-1043121/Forget-portable-phone-battery-use-LIGHTNING-recharge-phone.html.

* cited by examiner

SUPER CONDUCTING SUPER CAPACITOR

FIELD OF THE INVENTION

This invention relates generally to massive electrical circuits and their fabrication, housed within a massive water resistant vacuum nonconductive shell made of concrete, ceramic, or other like nonconductive material, using layers of localized abundant natural resources such as sand, or other dielectric materials, etc., as insulators (whether human fabricated or naturally occurring); human fabricated or naturally occurring layers of metallic materials such as iron, aluminum, etc., as conductors; a metallic probe emanating from the housing and connected in parallel with each conductive layer; and human generated or naturally occurring phenomena such as lightning, as a source of power to the probe. More particularly, this invention relates to a process for forming a macroelectronic assembly with integral multilayer capacitors that have a wide range of capacitance values based on their very wide radii and number of layers formed in its housing. Electricity thusly captured can then be stored and distributed for human consumption. A new type of electrical power plant is contemplated employing this super capacitor technology, providing electrical energy to the power grid and for use by electrical filling stations for electrical transport vehicles, such as cars, trucks, buses, ships, trains and aircraft.

BACKGROUND

Microelectronic capacitors are typically formed by patterning a conductive region on a ceramic substrate to define a bottom electrode, depositing a thin layer of a dielectric material over the bottom electrode to form the dielectric for the microelectronic capacitor, and then forming a second electrode over the dielectric, patterned to form the microelectronic capacitor, using a second conductive region above the dielectric material. In this way, microelectronic capacitors store electric charge, and since work must be done to charge the microelectronic capacitor, the microelectronic capacitor will also store electric potential energy. If one considers an example isolated metallic sphere of radius R, any electric charge stored on this sphere, call it Q, can be articulated as a potential:

$$V = \frac{1}{4\pi\varepsilon_0} \frac{Q}{R}$$

such that the amount of charge stored on the sphere is directly proportional to the potential (V). This proportionality exists for any conductor of any shape or size. Capacitance (C) of this single conductor is large if the conductor is capable of storing a large amount of charge at a low potential, so that the relation:

$$Q = CV \text{ becomes } C = \frac{Q}{V} = \frac{Q}{\frac{1}{4\pi\varepsilon_0} \frac{Q}{R}} \quad Q = 4\pi\varepsilon_0 R$$

Therefore, the capacitance of the sphere increases with its radius, and many such spheres wired together in parallel creates a net capacitance that is the sum of their individual capacitances. Furthermore, capacitors store not only electric charge (Q), but also electric potential energy (U), which can be expressed roughly as:

$$U = \frac{1/2\, Q^2}{C}$$

(ignoring the energy density in the dielectric layers). The electric potential energy (U) is also the total amount of work that must be performed to charge the capacitor.

What is needed is a macroelectronic circuit referred to herein as a super capacitor and method that exploits the above relationships to be used to capture and store the electric charge of lightning, whether naturally occurring or human generated, as an alternative energy source for human consumption. After determination of the total energy range generated by lightning strikes in a particular setting, an optimum radius and number of embedded parallel layers of capacitors forming the super capacitor of the present invention can be established based on the area of land, or other substrate, that is available to support the super capacitor housing of the present invention.

SUMMARY

A super capacitor and method forming massive embedded capacitors connected in parallel over a very wide radius that can vary from a few square feet to hundreds or thousands of square miles, and more, is disclosed. The super capacitor is formed within a water proof vacuum housing to keep out water and humidity by depositing a plurality of alternating layers of dielectric material between each layer of conducting material, whereby one or more electrodes are situated on each dielectric layer, thus forming a super capacitor having at least one probe electrode exuding from said housing, and connected to the one or more electrodes, for receiving electric charge from a lightning source for example. One can contemplate many dielectric layers separating many conductor layers from a few layers to thousands, and possibly even millions or more layers delineated, for example, to define a multilayer capacitive structure capable of providing electric power to supplement or replace other sources of electric power that harm the environment.

DETAILED DESCRIPTION

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). While a particular configuration for the invention is shown in FIG. 1, those skilled in the art will appreciate that variations and modifications are possible, and such variations and modifications are within the scope of this invention.

Figure 1:
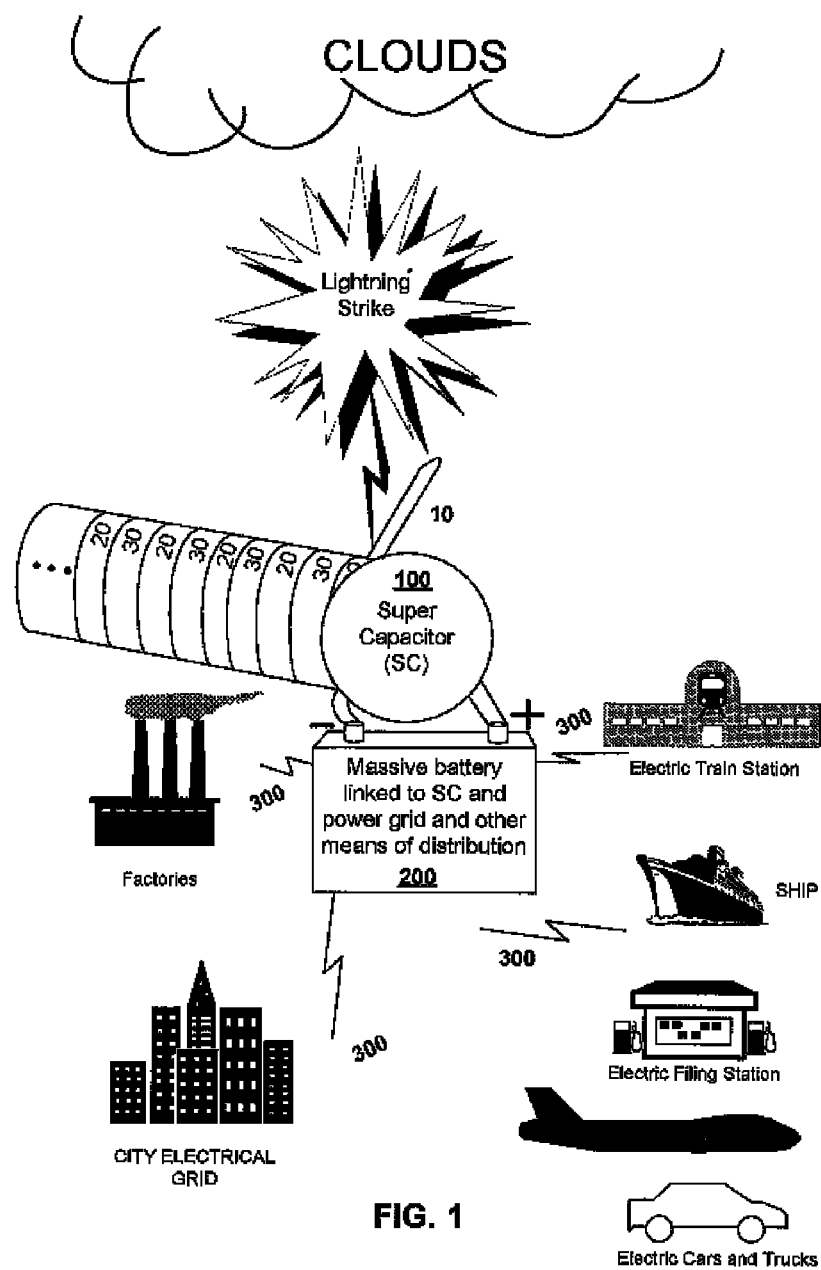
FIG. 1 illustrates one contemplated embodiment of a super capacitor by which massive embedded super capacitors are connected in parallel over a very large land area in accordance with certain embodiments of the present invention using a ceramic material for a water proof housing, silicon as the dielectric insulator material forming each insulating layer, and metallic sheets as conductors forming each conducting layer.

Referring now to FIG. 1, the macroelectronic circuit of the present invention, referred to herein as the super capacitor 100 (hereinafter SCSC), is shown as having alternating layers of conductors 20 and dielectric material 30, similar in structure to prior art microelectronic parallel capacitor circuits, and at least one probe electrode 10 for receiving the lightning strike. The primary differences over prior art capacitors are size, power scale, purpose, and lightning as a power source. One embodiment of the present invention contemplates connecting the SC 100 to a massive battery system 200 (hereinafter massive battery) that receives the generated electrical energy so as to free up the SC 100 for more lightning strikes. The massive battery 200 can also be linked with an electrical power grid 300 that can comprise direct connections to Electric Train Stations, Factories, and Electric Filling Stations for transfer to transport vehicles such as electric trucks, cars, ships and aircraft.

Figure 2:
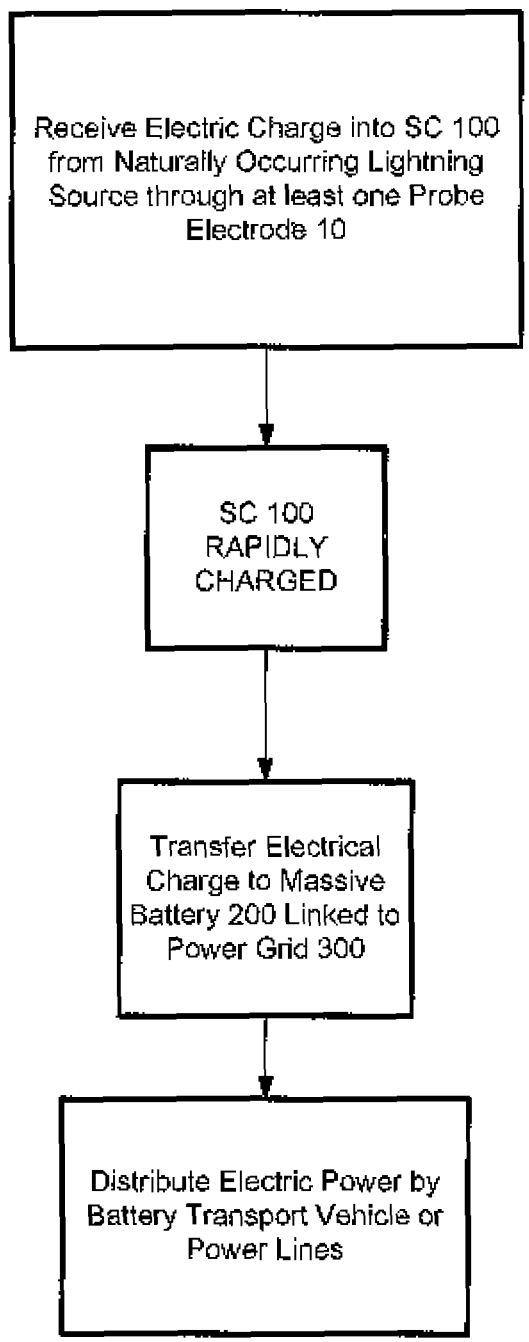
FIG. 2 is a block diagram that illustrates a naturally occurring embodiment of the method of the present invention.

Referring now to FIG. 2, the best mode for practicing the invention is to utilize free and naturally occurring lightning. However, this method limits the invention to use in geographic areas where there is substantial rain, and thus naturally occurring lightning.

Figure 3:
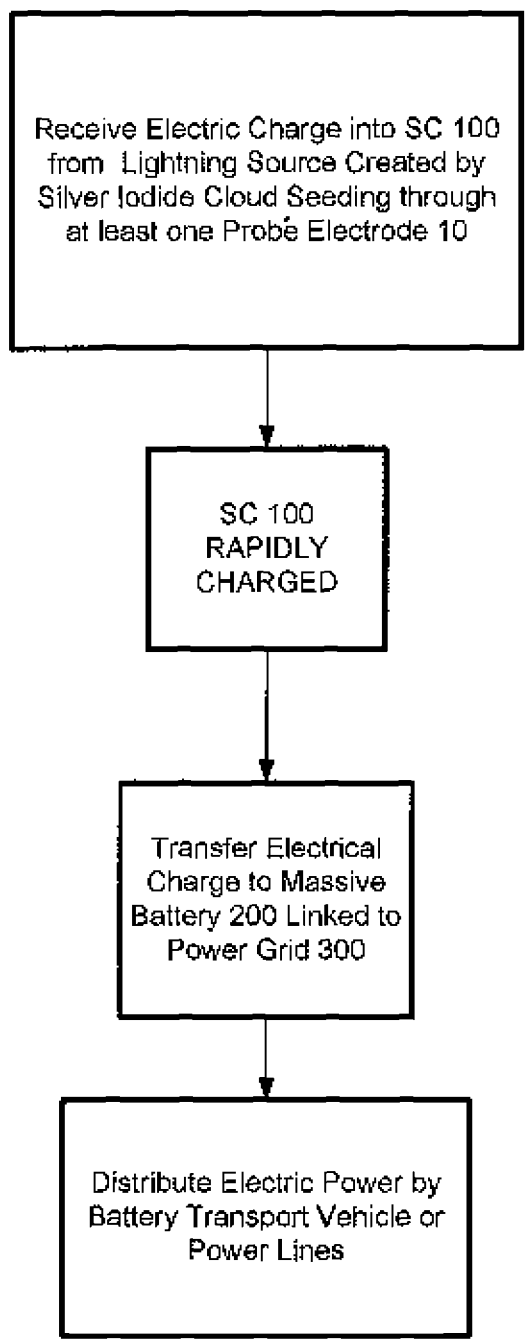
FIG. 3 is a block diagram that illustrates a human controlled embodiment of the method of the present invention.

Referring now to FIG. 3, an alternative, but more costly, method to practice the invention, but which overcomes geographic limitations, is to create lightning by ionization of the atmosphere, such as by silver iodide cloud seeding to generate rain, and therefore, lightning.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

In various aspects, the invention discloses a super capacitor comprising: a plurality of embedded parallel capacitors having radii in excess of ten feet enclosed in a water proof housing; at least one metallic probe connected to said capacitors and exuding from said housing for receiving electrical energy from a lightning source to charge said super capacitor. One embodiment of the super capacitor recited above may include a massive battery capable of being electrically connected to said super capacitor. Another embodiment may include the capability of electrically connecting the super capacitor to an electrical power grid. Yet another embodiment may include combining these capabilities, wherein said massive battery is electrically connected to an electrical power grid. Said embedded parallel capacitors may have any dielectric material, and one embodiment uses sand as a dielectric material. Said embedded parallel capacitors may have any conductor material, and one embodiment uses iron as a conductor material. Alternatively, said embedded parallel capacitors may have silicon as a dielectric material. Said embedded parallel capacitors may have metallic sheets for conductor material. Another set of possible embodiments, comprise methods of capturing electrical energy from lightning, comprising the steps of:

(a) placing near a lightning source at least one probe electrode of a super capacitor having alternating layers of conductors and dielectric material each having radii in excess of ten feet to form a multilayer parallel capacitive structure, said multilayer parallel capacitive structure being formed of embedded massive parallel capacitors within a water proof housing; and (b) receiving electrical energy from a lightning strike using said at least one probe electrode connected to said embedded massive parallel capacitors, said at least one probe electrode exuding from said housing.

One embodiment comprises the additional step of electrically connecting a massive battery to said super capacitor. Another embodiment comprises the additional step of electrically connecting said super capacitor to an electrical power grid to function as an alternative energy source. Another method of generating electricity comprises the steps of:

(a) generating lightening by cloud ionization near at least one probe electrode of a super capacitor, said super capacitor having alternating layers of conductors and dielectric material each having radii in excess of ten feet to form a multilayer parallel capacitive structure, said multilayer parallel capacitive structure being formed of embedded massive parallel capacitors within a water proof housing; and (b) receiving electrical energy from a lightning strike through said at least one probe electrode connected to said embedded massive parallel capacitors, said at least one probe electrode exuding from said housing.

What is claimed is:

1. A super capacitor comprising:
   a plurality of embedded parallel capacitors, formed by alternating layers of conductors and dielectric material, having radii in excess of ten feet and enclosed within a water proof housing;
   at least one ungrounded probe having a human generated power source, directly connected to one or more electrodes situated on one or more dielectric layers of said super capacitor and exuding from said water proof housing for receiving electrical energy from a lightning source to charge said super capacitor.

2. The super capacitor of claim 1, wherein a battery is electrically connected to said super capacitor.

3. The super capacitor of claim 1, wherein said super capacitor is electrically connected to an electrical power grid.

4. The super capacitor of claim 2, wherein said battery is electrically connected to an electrical power grid.

5. The super capacitor of any of claim 1, wherein said embedded parallel capacitors have sand as a dielectric material.

6. The super capacitor of any of claim 2, wherein said embedded parallel capacitors have sand as a dielectric material.

7. The super capacitor of any of claim 3, wherein said embedded parallel capacitors have sand as a dielectric material.

8. The super capacitor of any of claim 1, wherein said embedded parallel capacitors have iron as a conductor material.

9. The super capacitor of any of claim 2, wherein said embedded parallel capacitors have iron as a conductor material.

10. The super capacitor of any of claim 3, wherein said embedded parallel capacitors have iron as a conductor material.

11. The super capacitor of any of claim 1, wherein said embedded parallel capacitors have silicon as a dielectric material.

12. The super capacitor of any of claim 2, wherein said embedded parallel capacitors have silicon as a dielectric material.

13. The super capacitor of any of claim 3, wherein said embedded parallel capacitors have silicon as a dielectric material.

14. The super capacitor of any of claim 1, wherein said embedded parallel capacitors have metallic sheets for conductor material.

15. The super capacitor of any of claim 2, wherein said embedded parallel capacitors have metallic sheets for conductor material.

16. The super capacitor of any of claim 3, wherein said embedded parallel capacitors have metallic sheets for conductor material.

17. A method of capturing electrical energy from lightning, comprising the steps of:
placing near a lightning source at least one ungrounded probe of a super capacitor having alternating layer of conductors and dielectric material each having radii in excess of ten feet to form a multilayer parallel capacitive structure, said multilayer parallel capacitive structure being formed of embedded parallel capacitors within a water proof housing, said at least one ungrounded probe having a human generated power source; and
receiving electrical energy from a lightning strike using said at least one ungrounded probe directly connected to one or more electrodes situated on one or more dielectric layers of said super capacitor, said at least one ungrounded probe exuding from said water proof housing.

18. The method of claim 17, wherein said conductors comprise metallic sheets and said dielectric material is silicon.

19. The method of claim 17, comprising the additional step of electrically connecting a battery to said super capacitor.

20. The method of claim 17, comprising the additional step of electrically connecting said super capacitor to an electrical power grid to function as an alternative energy source.

21. A method of generating electricity, comprising the steps of:
generating lightning by ionizing the atmosphere near at least one ungrounded probe of a super capacitor, said super capacitor having alternating layers of conductors and dielectric material each having any shape with radii at a shortest side in excess of ten feet to form a multilayer parallel capacitive structure, said multilayer parallel capacitive structure being formed of embedded parallel capacitors within a water proof housing, said at least one ungrounded probe having a human generated power source; and
receiving electrical energy from a lightning strike through said at least one ungrounded probe directly connected to one or more electrodes situated on one or more dielectric layers of said super capacitor, said at least one ungrounded probe exuding from said water proof housing.

22. The method of claim 21, wherein ionizing the atmosphere comprises cloud seeding.

* * * * *